May 3, 1927.
D. F. CHAMBERS
BALL RETAINER FOR BALL BEARINGS
Filed Jan. 7, 1926
1,627,232
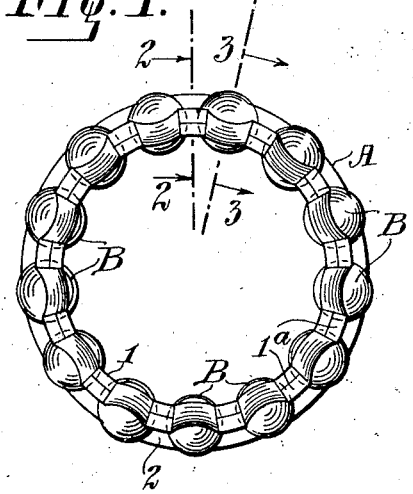
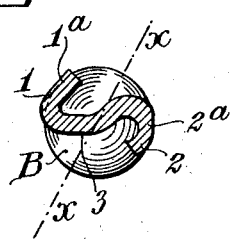
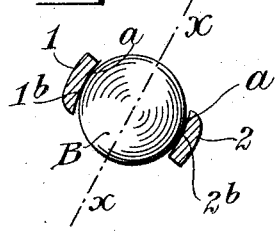
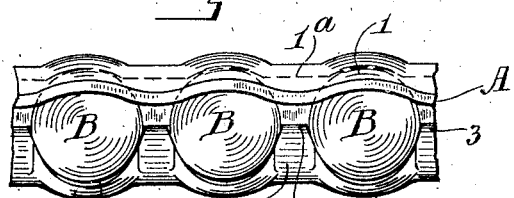
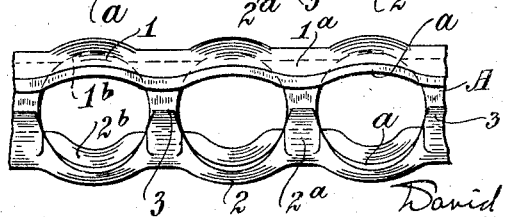
INVENTOR
David F. Chambers
BY
Redding, Greeley, O'Shea Campbell
ATTORNEYS Patented May 3, 1927.

1,627,232

UNITED STATES PATENT OFFICE.

DAVID F. CHAMBERS, OF LANCASTER, PENNSYLVANIA, ASSIGNOR TO THE BEARINGS COMPANY OF AMERICA, OF LANCASTER, PENNSYLVANIA, A CORPORATION OF NEW JERSEY.

BALL RETAINER FOR BALL BEARINGS.

Application filed January 7, 1926. Serial No. 79,706.

The present invention resides in an improvement on the ball retainer shown in Letters Patent of the United States No. 1,011,028, dated December 5, 1911, and granted upon the application of the present applicant. The ball retainer covered by that patent has had a wide use but has always been subject to criticism that the balls are not held by it on their axes of rotation and that there is considerable wear between the balls and the edges of the apertures in which they are mounted. It has also been found that the ball retainer of that patent, while useful in an end thrust bearing, is not adaptable for angular contact radial bearings. It is the object of this invention to improve the construction of retainers of the general character of that shown in said Letters Patent so as to overcome the objections above mentioned and to provide a retainer in which the balls shall be held so that they shall rotate on their respective axes of rotation and so as to produce a one-piece wall cage adaptable for use in angular contact radial bearings.

In accordance with the invention, the retainer, generally S-shaped in cross section and formed with apertures between its opposite edges to receive the balls, somewhat as shown in said patent, is crimped between the apertures so as to form pockets in which the balls are held on their axes of rotation. The retainer is not symmetrical in cross section, but one edge portion is displaced toward the axis of the bearing while the opposite edge portion is displaced away from the axis, whereby the axis of rotation of each ball is inclined with respect to the axis of the bearing and the retainer with its balls is adaptable for angular contact radial bearings.

The invention will be more fully explained hereinafter with reference to the accompanying drawing in which it is illustrated as embodied in a suitable form and in which:

Figure 1 is a face view of the improved retainer with the balls in position.

Figure 2 is a detail view in section on the plane indicated by the broken line 2—2 of Figure 1 and on a larger scale.

Figure 3 is a detail view in section on the plane indicated by the broken line 3—3 of Figure 1 and on a larger scale.

Figure 4 is a detail view, also on a larger scale than that of Figure 1, showing a portion of the retainer with its balls as seen from a point of view at an oblique angle with respect to the plane of the retainer.

Figure 5 is a view similar to Figure 4, but without the balls.

The improved retainer is formed as an annulus A with flanges or marginal portions 1 and 2 directed oppositely from the middle or body portion 3, in which are formed apertures $a$ adapted to receive the balls B which project therefrom for contact with the raceways. The retainer shown in said Letters Patent is symmetrical in cross section with reference to the horizontal plane of the retainer, the flanges 1 and 2 being aligned substantially in a cylindrical plane at right angles with the axis of the retainer but bent or inclined slightly so as to retain the balls in the apertures. The bearing thus formed is adapted only for end-thrust, the pressure being received by the balls in lines parallel with the axis of the bearing. Obviously it is not adapted for annular contact, that is, for contact with the raceways in lines which are angularly or obliquely disposed with respect to the axis of the bearing. In the present case, however, the retainer is asymmetrical, the marginal portion or flange 1 being bent or inclined inwardly somewhat toward the axis of the bearing, while the marginal portion or flange 2 is bent or inclined outwardly somewhat with respect to the same axis, the circle formed by the median line of the one flange being of a smaller radius than that formed by the median line of the other flange. This construction permits the balls to contact with the raceways in a plane which is angularly disposed with respect to the plane of the bearing, as indicated by the broken line $x$, $x$ of Figures 2 and 3, whereby the retainer is adapted for angular contact radial bearings.

The balls are retained in the apertures by the bending over of the marginal portions or flanges, as shown in Figures 3 and 4, somewhat as in the construction shown in said Letters Patent, but in order that the balls may be received in spherical seats or pockets, in which they are held on their axes of rotation, as shown in Figure 3, the retainer is crimped as to the marginal portions or flanges between the apertures $a$, as indicated at $1^a$ and $2^a$ in Figures 2, 4 and 5, whereby there are formed spherical or concaved seats, as indicated at 1ᵇ and 2ᵇ in Figure 3, in which the balls are held at their poles, that is to say, at the extremities of their axes of rotation. The retainer and the balls can be assembled in any convenient manner as described, for example, in said Letters Patent, by first forming the retainer with one flange bent or inclined to the proper angle, placing the balls in the aperture, and then swaging or bending the other marginal portion or flange so as to retain the balls in the apertures, or, in some cases, as also suggested in said Letters Patent, the retainer might be completely formed and the balls afterwards snapped into place. The crimping of the retainer, in the manner above described, can be effected by pressure at any convenient stage in the manufacture.

I claim as my invention:

1. A ball retainer for ball bearings consisting of a unitary annulus having flanges extended from its margins in opposite directions and being formed with apertures between its margins to receive the balls, the retainer being asymmetrical in cross section with respect to the plane of the retainer, and means formed in the flanges for positively retaining the ball therebetween, each flange being formed to contact with each ball at a plurality of spaced points.

2. A ball retainer for ball bearings consisting of a unitary annulus having flanges extended from its margins in opposite directions and being formed with apertures between its margins to receive the balls, the retainer being crimped between the apertures to form concaved seats for the balls.

3. A ball retainer for ball bearings consisting of an annulus having flanges extended from its margins in opposite directions and being formed with apertures between its margins to receive the balls, the retainer being asymmetrical in cross section with respect to the plane of the retainer, with one flange inclined away from the annulus and toward the axis of the retainer and the other flange inclined away from the annulus and away from the axis of the retainer, and with the circle of the median line of one flange of smaller diameter than the circle of the median line of the other flange, the retainer being crimped as to its flanges between the apertures to form concaved seats for the balls.

This specification signed this 5th day of January A. D. 1926.

DAVID F. CHAMBERS.